United States Patent [19]

Nolan

[11] 4,036,344
[45] July 19, 1977

[54] MULTIPLE-PLATE CLUTCH
[75] Inventor: John M. Nolan, Pittsfield, Mass.
[73] Assignee: General Electric Company
[21] Appl. No.: 640,533
[22] Filed: Dec. 15, 1975
[51] Int. Cl.² .................................................. F16D 47/54
[52] U.S. Cl. .................................. 192/48.3; 192/48.7; 192/57; 192/85 AA
[58] Field of Search .................. 192/53, 85 AA, 48.5, 192/48.3, 48.7, 57

[56] References Cited
U.S. PATENT DOCUMENTS

| | | | |
|---|---|---|---|
| 3,315,773 | 4/1967 | Aschauer | 192/48.3 |
| 3,360,087 | 12/1967 | Hilpert | 192/85 AA |
| 3,814,226 | 6/1974 | White | 192/85 AA |
| 3,851,532 | 12/1974 | Pfuger | 192/48.3 |

Primary Examiner—Samuel Scott
Assistant Examiner—Randall Heald
Attorney, Agent, or Firm—Francis K. Richwine

[57] ABSTRACT

A low loss, multiple element wet clutch mechanism for connecting two mechanical members to each other wherein the two members are concentric about a common axis and either or both are supported for rotation about the common axis. The connection is made by clutch elements which are forced together by an actuator. Clutch elements on one side of the interface are keyed to one member to limit rotational movement about the axis to that of the member while clutch elements on the other side of the interface are keyed to a rotating annular carrier element carried by the second member. A second annular element mounted on the same member as the carrier is keyed to the member for rotational movement about the axis but is free to translate axially of the member to engage the rotating annular carrier element to key the clutch elements carried by it to that member. A clutch engaging actuator when actuated first causes the two annular elements to engage and thereafter the clutch elements. In "unclutched" mode, the clutch elements on one side of the clutch interface are free of connection to either member and therefore do not cause viscous drag power losses.

3 Claims, 1 Drawing Figure

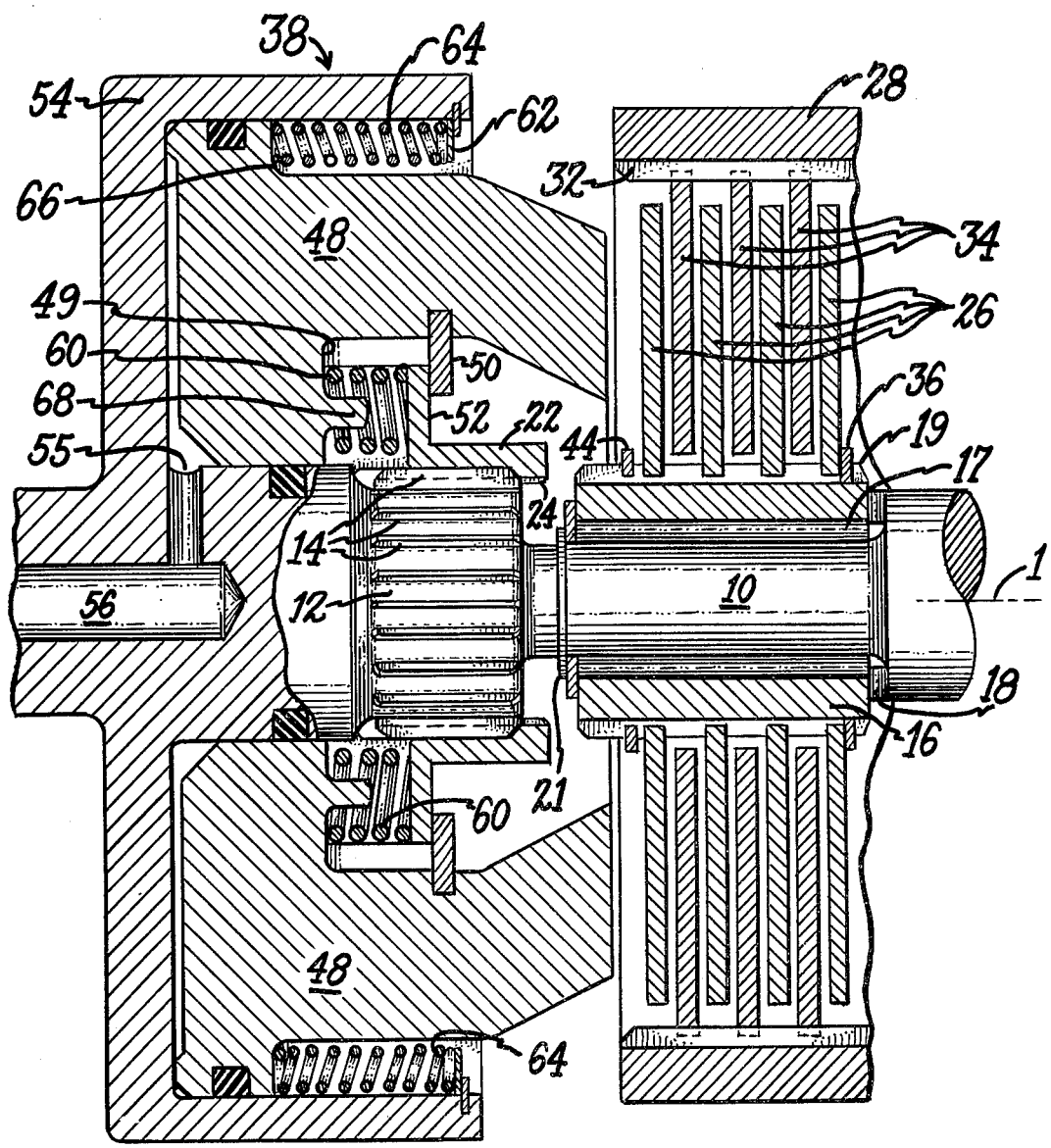

4,036,344

MULTIPLE-PLATE CLUTCH

BACKGROUND OF THE INVENTION

1. FIELD OF THE INVENTION

The invention relates to multiple-element clutches and, more particularly, to multiple-plate clutches employed in transmissions.

2. DESCRIPTION OF THE PRIOR ART

Multiple-plate clutches are commonly used in power-transmitting devices. In general, such clutches serve to selectively couple two members. This is commonly accomplished by having a plurality of plates affixed to a first member engage a plurality of plates affixed to a second member so that when all the plates are forced together in frictional engagement, the members are locked or coupled together. The multiple-plate clutch may be used to couple a rotating member to a member which it is desired to rotate. Such a clutch also may be used to connect a fixed member and a rotating member so that the rotation of the rotating member is stopped.

The chief problem with previous multiple-plate wet clutches has been their power absorption when the plates are not engaged but are proximate one another and there is rotational activity between adjacent plates. This can be of most concern when a first member coupled to a first set of clutch plates is under power while a second member coupled to a second set of clutch plates is not under power. In such a case, because of the closeness of the plates attached to each member and viscous drag occurring therebetween, the plates attached to the powered member tend to cause the plates attached to the non-powered member to rotate. Thus, the viscous drag interaction of the plates causes power losses which lead to inefficiency of the overall device in which the clutch is incorporated.

The foregoing undesirable condition may be solved by spacing the plates at a great enough distance from each other so that viscous interaction is minimized. However, this is generally not feasible because of space constraints and because of the longer times required to effect clutch engagement. In a structure according to the present invention, the clutch plates are permitted to rotate together with little or no relative motion, so that little viscous drag occurs between the plates.

Accordingly, it is an object of the invention to provide a new and improved multiply-plate clutch wherein the plates of the clutch in the disengaged mode are free to rotate at a speed in order that viscous drag losses may be eliminated or greatly reduced.

SUMMARY OF THE INVENTION

The invention pertains to a multiple-element clutch particularly adapted to operation in a viscous medium with minimum power losses as a result of fluid interaction between clutch elements. The reduction of losses is accomplished by disengagement of clutch elements, when not in use, from the component to which they are attached for interaction with other clutch elements. Therefore, the invention may be summarized as a multiple element clutch in which clutch elements associated with at least one of the driving or driven members are mounted on a carrier element which is permitted motion independent of the member when not in use. A second element is provided for locking the carrier to the member as a first action in clutch engagement. This can be implemented for use in a system where driving and driven members (or stationary and moving members) are arranged to contemplate rotary motion about a common axis by mounting the clutch elements associated with one (or both) of the members on a carrier which is free to rotate about the common axis until engaged by an additional or interlocking element which is keyed to the member with respect to rotary motion about the axis but which has a freedom of motion of translation to permit it to move to a position interlocking the carrier and the member. An actuating means is provided that operates in a two step fashion by first engaging the interlocking element to cause the carrier to be keyed to the member for rotational motion about the axis identical to the member and secondly engaging the clutch elements of the two members with each other in a normal clutch engagement.

Synchronizing means can be provided to cause smooth engagement of the first and second collars. Restoring means are provided to retract the actuating means and thus disengage the plates and the first and second collars.

DESCRIPTION OF THE DRAWING

The drawing is a schematic representation of a cross-section of a multiple-plate clutch according to the invention.

DESCRIPTION OF THE INVENTION

Referring to the drawing which depicts one practical implementation of the invention, a member or shaft 10 is shown. Shaft 10, which is concentric about and may or may not be rotatable about center line 1, includes a portion 12 having splines 14 disposed about the outer surface thereof. Rotatably mounted about shaft 10 is an annular element or first collar 16, which collar is supported for rotation about shaft 10 by bearings 17 and 18, and which collar includes splines 19 disposed about the outer surface thereof. Axial movement of collar 16 along shaft 10 is prevented, as for example, by stop 21.

A second annular element or collar 22 having inner splines 24 and shoulder portion 52 is disposed about portion 12, with splines 24 engaging splines 14. Thus, collar 22 is capable of axial translation along portion 12 but no relative rotatable motion with respect to portion 12 is possible.

A plurality of splined plates 26 are disposed about the first collar 16. Since the splines of plates 26 engage splines 19 of collar 16, axial translation of plates 26 is possible but no relative rotational motion with respect to collar 16 is possible.

A second member 28 is disposed concentrically outwardly of shaft 10 and may be rotatable about the axis of 10 or may be fixed. Member 28 includes a portion having splines 32 about the inner surface thereof. Disposed within and supported by splines 32 of rotatable member 28 are a plurality of inwardly extending splined plates 34, which plates are interspaced between plates 26 mounted on collar 16. A stop 36 is affixed to collar 16 to limit the axial translation in one direction of plates 34 and 26, allowing plates 26 and 34 to be frictionally engaged upon compression thereof.

An actuating means 38 is provided in order to engage collars 16 and 22 and to force plates 26 and 34 together. Affixed to collars 16 and 22 can be synchronizing means, which synchronizing means may be of any well-known type. Synchronizing means serve to substantially eliminate relative motion between collars 16 and 22 prior to engagement of collars 16 and 22. Collar 16 also includes a stop 44 which limits the axial translation in one direction of collar 22.

Actuating means 38 comprises a piston 48 having a second collar return element 50 attached thereto, which element may be a flange and interacts with the shoulder portion 52 of the second collar 22. Actuating means 38 is supported for axial translation within a housing 54, A passageway 56 within housing 54 provides access for hydraulic fluid to chamber 55. By applying or relieving the hydraulic pressure within passageway 56 and chamber 55, actuating means 38 may be operated by axial translation of piston 48.

Actuating means 38 also includes means for causing an axial translation of second collar 22 to engage first collar 16 as a part of engagement of the clutch. Shoulder 52, rigidly affixed to second collar 22, constitutes a first spring support and supports a spring 60, which spring is disposed between shoulder 52 and a spring base portion 49 of piston 48 of actuating means 38. When it is desired to axially translate second collar 22 in order to engage first collar 16, hydraulic pressure may be applied within passageway 56 and chamber 55, causing piston 48 to translate and thus advance second collar 22 due to the interaction of the shoulder 52 on collar 22 and spring 60.

A return mechanism is provided for piston 48 including a spring support 62 rigidly affixed to housing 54. A return spring 64 is disposed between a pressure plate surface on piston 48 of the actuating means 38 and second spring support 62 so that piston 48 is returned to a rest position when hydraulic pressure within passageway 56 is released. As previously noted, a return mechanism is also provided for collar 22 including shoulder 52 and second collar element 50. When piston 48 of the actuating means 38 is retracted by spring 64, element 50 engages the shoulder portion 52 causing collar 22 to disengage from collar 16.

Serious damage could occur to splines 19 and 24 if collars 16 and 22 inadvertently should not engage. To prevent such damage, actuating means 38 includes a stop 68 protruding from the spring base portion 49 of piston 48. In the event collars 16 and 21 do not engage, further translation of actuating means 38 is prevented by engagement of stop 66 with spring support 58, which occurs after spring 60 has been compressed.

Operation

It will be assumed that rotatable member 28 is powered and shaft 10 is non-powered; further, it is desired to lock rotatable member 28 and shaft 10 together so that they rotate at the same speed. Clutch engagement is as follows:

1. Hydraulic pressure is applied within passageway 56 and chamber 55 causing piston 48 of actuating means 38 to move axially with respect to shaft 10.

2. Spring 60 by pressure against shoulder 52 advances collar 22 axially along portion 12 of shaft 10.

3. Synchronizing means, if used, would engage, eliminating or greatly reducing relative rotation between collars 16 and 22 and, dependent on the type of synchronizer utilized, line up the splines on collars 22 and 16.

4. Splines 19 and 24 of collars 16 and 22 respectively engage, thus locking collar 16 to the shaft 10 by means of collar 22 and spline 14 on the portion 12.

5. As hydraulic pressure is further increased enlarging chamber 55 and displacing piston 48, collar 22 continues its axial translation until stop 44 is encountered. Piston 48 continues to move until plates 26 and 34 are forced together, the amount of movement of plates 26 and 34 being limited by stop 36. At this point, rotatable member 28 and shaft 10 are locked together.

When clutch disengagement is desired, the following occurs:

1. Hydrualic pressure within passageway 56 and chamber 55 is released.

2. Spring 64 imparts a restoring force to piston 48, thus disengaging plates 26 and 34.

3. As piston 48 continues to move, second collar return element 50 encounters the shoulder 52 on collar 22. Continued movement of the piston 48 causes disengagement of collars 16 and 22.

Upon disengagement, it will be assumed that rotatable member 28 is still powered and shaft 10 is non-powered. Since plates 26 and 34 are spaced closely together, a viscous drag interaction occurs therebetween. However, since collar 16 is free to rotate about shaft 10 on bearings 17 and 18, collar 16 and plates 26 will tend to rotate at substantially the same speed as plates 34 and rotatable member 28. Thus, the effect of a viscous drag interaction between plates 26 and 34 is minimized since little or no relative rotational motion between them occurs.

An alternative operational mode is the case where either one of the rotatable members is fixed and it is desired to stop the rotation of the other rotatable member. Engagement and disengagement is the same as in the above-mentioned mode, except that the mechanism is stationary after clutch engagement. Even prior to engagement, losses are low because collar 16 and plates 26 are free to either rotate or stand still, depending on the motion or lack of motion of plates 34.

While a specific embodiment of the invention has been described, it will be obvious to those skilled in the art that changes and modifications may be made without departing from the invention. It is, therefore, intended in the appended claims to cover all such changes and modifications that fall within the true spirit and scope of the invention. By way of example, but not by way of limitation, such changes and modifications could include the use of a different kind or number of plates and differing forms of restoring or actuating means, as for example, mechanical or electrical actuating means in lieu of the hydraulic piston.

We claim:

1. A multiple element clutch comprising:
   a. two members disposed concentrically about a common axis with either or both of said members having freedom of rotational movement about said axis;
   b. a plurality of clutch elements with at least one clutch element carried by each member for interconnecting said members for uniformity of rotation about said axis when said clutch elements are engaged with each other;
   c. said clutch elements comprising a series of clutch plates centered on said axis with alternate plates carried by a different one of the two members;
   d. said alternate clutch plates carried by one member being keyed to a carrier for rotational movement about said axis with said carrier independently of said member and for translational movement parallel to said axis independently of said carrier;
   e. said carrier being ring-shaped, centered on said axis and attached to said one member so as to permit rotational motion about said axis independently of said one member and so as to deny axial translation independently of said one member;

f. said alternate clutch plates carried by the other said member being attached thereto so as to deny their rotational motion about said axis independently of said other member and so as to permit their axial translation independently of said other member;

g. interconnecting means for locking said clutch elements and said carrier to said one member for unitary rotation with respect to said axis;

h. said interconnecting means being a ring-shaped element centered on said axis and keyed to said one member proximate said carrier so as to deny its rotation about said axis independently of said one member and to permit its translation parallel to said axis to permit contact with said carrier;

i. said carrier and said interconnecting means each having locking means to engage with each other on contact to lock said carrier and interconnecting means together for unitary rotational motion about said axis;

j. actuating means for sequentially:
 1. actuating said interconnecting means to lock said one member to its clutch element,
 2. causing said plurality of clutch elements to engage each other to interconnect said members with respect to rotation about said axis,
 3. disengaging said clutch elements, and
 4. deactivating said interconnecting means;

and k. said actuating means comprising a hydraulic piston supported by one of the members for movement parallel to said axis, said piston including means for translating said interconnecting means into and out of contact with said carrier and means for exerting a force against said clutch elements to press said clutch elements together, whereby deleterious effects of interaction between disengaged clutch elements as a result of operation in a viscous medium are abated.

2. Clutch means for interconnecting two members each having a portion which is symmetrical about a common axis about which at least one of said members is rotatable comprising:

a. two movable elements mounted proximate each other on a first said member concentric with said axis, one moveable element being a clutch element carrier secured against axial translation relative to said first member but permitted rotary motion about said axis independently of said first member, the other moveable element being an interconnecting element keyed to said first member with respect to rotary motion about said axis but permitted independent translational motion parallel to said axis to permit the interconnecting element to be translated to contact said carrier, said moveable elements having mutually engageable means to cause them on contact to be secured together relative to rotational motion about said axis with said first member;

b. clutch elements attached to each member for frictional engagement with each other to permit clutching of said members relative to rotation about said axis, said clutch elements attached to said first member being mounted on said carrier and keyed to said carrier with respect to rotational motion about said axis while being permitted limited axial translatory movement to permit alternate engagement with and disengagement from other clutch elements, said clutch elements attached to the second said member being keyed to that member with respect to rotational motion about said axis while being permitted limited axial translatory movement to permit alternate engagement with and disengagement from other clutch elements; and c. actuating means including:
 1. axial reciprocating means for sequentially translating said interconnecting element into interlocking engagement with said carrier and translating said clutch elements into frictional contact with each other,
 2. power means for actuating said reciprocating means,
 3. restoration means for restoring said reciprocating means to an original position on deactivation of said power means releasing said clutch elements from frictional contact, and
 4. retraction means for returning said interconnecting means to a position wherein it is spaced from said carrier.

3. The clutch means defined in claim 2 wherein:

a. said clutch element carrier is a collar journaled on said first member and has splines for engagement with splines on said interconnecting element;

b. said interconnecting element is a collar splined to said first member;

c. said clutch elements are a series of clutch plates centered on said axis and alternately keyed to said carrier and to said second member; and d. said reciprocating means is a hydraulically actuated piston carried by said first member for axial translation when activated toward said second member;

whereby at least one set of clutch plates is free to idle when the clutch is disengaged thereby eliminating viscous drag between adjoining plates when in a viscous medium.

* * * * *